Figure 1:
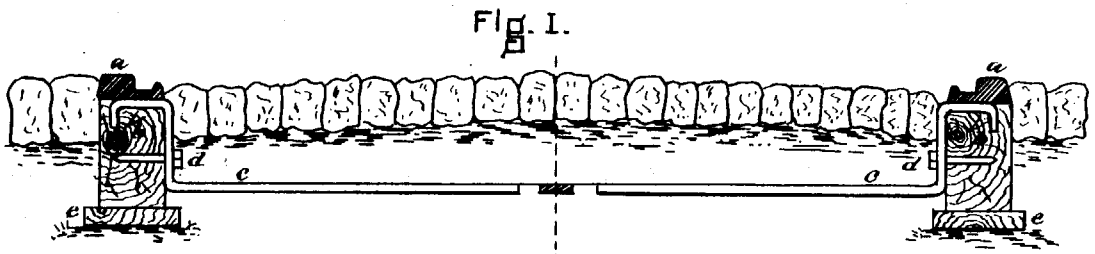

BEST AVAILABLE COPY

J. S. HYDE, deceased.

T. W. CLARKE, assignee, W. PEET & M. L. HYDE, administrators.

Construction of Railways.

No. 8,465. Reissued Oct. 22, 1878.

WITNESSES
F. F. Raymond 2d
Geo. F. Walker

INVENTORS
Assignee.
Thos. Wm. Clarke

N. PETERS, PHOTO-LITHOGRAPHER, WASHINGTON, D. C.

UNITED STATES PATENT OFFICE.

THOMAS WM. CLARKE, OF BOSTON, MASSACHUSETTS, ASSIGNEE OF WILLIAM PEET AND MARIAN L. HYDE, ADMINISTRATORS OF JAMES S. HYDE, DECEASED.

IMPROVEMENT IN CONSTRUCTION OF RAILWAYS.

Specification forming part of Letters Patent No. 51,904, dated January 2, 1866; Reissue No. 8,465, dated October 22, 1878; application filed May 9, 1878.

*To all whom it may concern:*

Be it known that JAMES S. HYDE, deceased, late of Brooklyn, in the county of Kings, in the State of New York, did invent certain new and useful Improvements in the Construction of Railways, of which the following is a full and clear description, reference being had to the accompanying drawing, making part of this specification, and to the letters of reference made thereon.

In the ordinary system of constructing city railways a light iron rail is laid upon a longitudinal wooden sleeper or sill of about the same width, which in turn rests upon a series of wooden cross-ties that are placed about five feet apart. The sills and cross-ties are sometimes merely spiked together, but they are generally furnished with iron knees at their junction, which cannot be fitted into their places until both the sills and ties are laid. Owing to the necessity for cutting the wood in making the necessary adjustments, these fastenings are liable to become loose, and they require constant supervision and care to keep them together, so that the track may be retained in its proper gage. When repairs are required in the timber substructure, as well as when it is first laid, it becomes necessary to remove the entire line of pavement between the rails, in order to get at the cross-ties.

The object of the said invention is to furnish an iron cross-tie that will not be liable to decay, and which will be easily made at first of the requisite size and form, so that the sills and rails to which it is applied must necessarily be set at the desired gage without further adjustment, and which will lock into the longitudinal sleeper and be held firmly in its place by the rail placed above it, so that the fastenings of the rail contribute materially and almost completely to the consolidation of the entire structure. To accomplish this result the said invention consists in making the cross-ties with the ends bent at right angles at the exact distance required between the sills, so that when the sills are placed against the ends thus turned up they require no further adjustment for the gage. The ends of the ties are further turned over the upper surfaces of the sills into recesses mortised therein for their reception, and are again finally turned so that the ends may be driven down into the body of the sills. It will thus be seen that the first-mentioned angles in the ties prevent the sills and rails coming together, and that the outer angles of the ties that are sunk into the wood prevent their spreading, and that the rails placed upon them and secured in the ordinary manner keep the ties in their places.

To enable others skilled in the art to which it pertains to make and use the said invention, I will proceed to describe its construction and operation with reference to the drawing.

Figure 2:
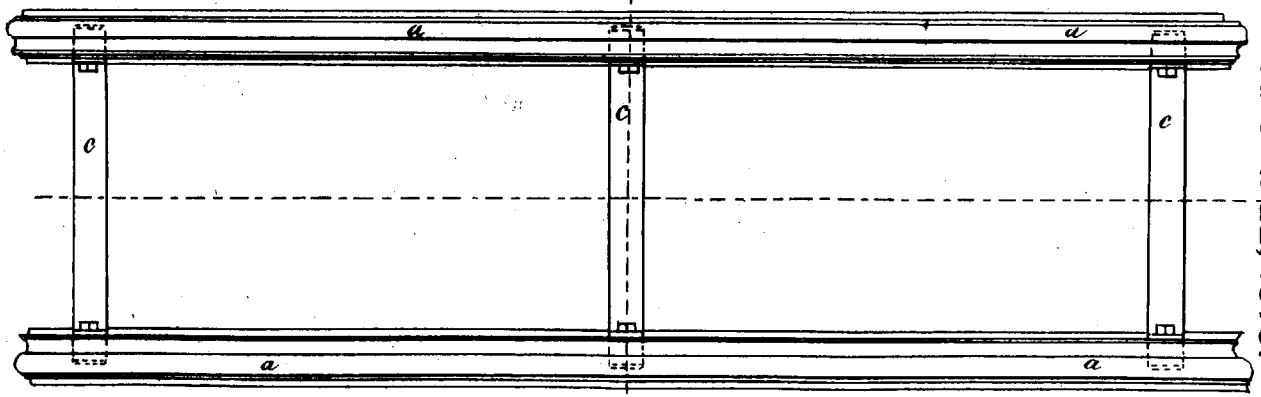

Figure 1 is a cross-section of a railway constructed according to the said invention, with iron ties locking into the wooden sills; and Fig. 2 is a plan of the same, drawn on a smaller scale.

The rails *a* are placed upon the longitudinal sills or sleepers *b*, to which they may be secured in the usual manner. The cross-ties *c* are turned up on the inner sides of the sills, and then over the upper faces into mortises cut for their reception, to leave a flush surface for the bearings of the rails, and then finally down again, so that the ends turn into the sills, in which they are tightly driven in the manner shown.

To prevent any undue strain of the angles of the ties a fastening, *d*, is used, for which a screw, spike, or bolt is peculiarly adapted.

In carrying the invention into effect it is preferable to bed the sills upon boards or planks *e*, that are somewhat wider than the sills, for the purpose of extending the area of the same, and that have been previously prepared with coal-tar or asphalt, or other similar material, to exclude moisture and prevent decay. The joints of the sills and the planks should be made to alternate, to form a continuous and uniform support for the rails placed upon them. The planks are first laid in longitudinal trenches duly prepared for their reception. The sills are then laid and secured, and the ties placed in the narrow transverse trenches that may be required, and driven into the sills and fastened, and finally the rails are laid and spiked or bolted in their places over the ties, thus securing with their fastenings a combination of the ties and sleepers.

In a similar manner to that which has been described in connection with city railways, said invention may be applied to and used with any kind of rails or chairs where the latter may be required.

It will be observed that the ties are placed wider apart in the drawing than is usual, and this economy arising from the invention is permitted by the fact that the mortising of the ties into the sills holds them more rigidly than is possible with any extraneous fastening, and hence admits a less number being used with equal efficiency.

What is claimed as the invention of the said JAMES S. HYDE is—

1. In the construction of street-railways laid without transverse sleepers or cross-ties beneath the longitudinal sleepers, stringers, or sills, the combination of longitudinal wooden sleepers for the support of the rail *b*, of metallic cross-ties *c*, embedded beneath the surface of the pavement which lies between the stringers, and laying hold of said stringers at their upper surface below the rail, without chairs or loops which embrace the timber, substantially as herein described.

2. In the construction of street-railways laid without transverse sleepers or cross-ties beneath the longitudinal sleepers, stringers, or sills, as a means of preserving the gage of the track, the combination, with the wooden stringers *b b*, which support the rails, of the metallic cross-ties *c*, abutted against the inside faces of said stringers and holding them apart, and fastened directly to the upper portion of said stringers immediately below the base of the rail, substantially as described.

3. A street-railway track consisting substantially only of the following elements and their connections: Longitudinal wooden stringers *b*, for the support of the rail, metallic cross-ties *c*, which lay hold directly of said stringers immediately below the rail and in the upper quarter of the stringers, and the rail supported by the stringer, all combined together, and all except the rail embedded in and below the surface of the pavement, substantially as described.

THOS. WM. CLARKE,
*Assignee, by mesne assignments, of Peet & Hyde, administrators of James S. Hyde.*

Witnesses:
F. F. RAYMOND, 2d.,
GEORGE F. WALKER.